(12) United States Patent
Gajewski et al.

(10) Patent No.: US 12,208,901 B2
(45) Date of Patent: Jan. 28, 2025

(54) SEATBELT FASTENING SYSTEM FOR A MOVABLE SEAT

(71) Applicant: Safran Seats, Plaisir (FR)

(72) Inventors: Jonathan Gajewski, Moissy-Cramayel (FR); Stéphane Chipault, Moissy-Cramayel (FR); Joel Marais, Moissy-Cramayel (FR)

(73) Assignee: Safran Seats, Plaisir (FR)

( * ) Notice: Subject to any disclaimer, the term of this patent is extended or adjusted under 35 U.S.C. 154(b) by 0 days.

(21) Appl. No.: 18/712,180

(22) PCT Filed: Nov. 16, 2022

(86) PCT No.: PCT/EP2022/082155
§ 371 (c)(1),
(2) Date: Aug. 24, 2024

(87) PCT Pub. No.: WO2023/094242
PCT Pub. Date: Jun. 12, 2023

(65) Prior Publication Data
US 2024/0425180 A1    Dec. 26, 2024

(30) Foreign Application Priority Data
Nov. 25, 2021    (FR) ...................... 2112489

(51) Int. Cl.
*B64D 11/06*    (2006.01)
*B60N 2/68*    (2006.01)
*B60R 22/20*    (2006.01)

(52) U.S. Cl.
CPC ............ *B64D 11/062* (2014.12); *B60N 2/688* (2013.01); *B64D 11/064* (2014.12); *B64D 11/0648* (2014.12); *B60R 2022/207* (2013.01)

(58) Field of Classification Search
CPC .................. B64D 11/062; B60N 2/688; B60R 2021/01272; B60R 2021/01265; B60R 2022/207
See application file for complete search history.

(56) References Cited

U.S. PATENT DOCUMENTS

| 2002/0089164 A1* | 7/2002 | Rouhana | B60R 22/02 280/801.1 |
| 2011/0057432 A1* | 3/2011 | You | B60R 22/20 280/804 |

(Continued)

FOREIGN PATENT DOCUMENTS

| CN | 109466501 A * | 3/2019 |
| DE | 102019124617 A1 | 3/2020 |

(Continued)

OTHER PUBLICATIONS

International Patent Application No. PCT/EP2022/082155, International Search Report and Written Opinion, dated Mar. 14, 2023.

*Primary Examiner* — Timothy J Brindley
(74) *Attorney, Agent, or Firm* — Kilpatrick Townsend & Stockton LLP

(57) ABSTRACT

A seat for an aircraft includes at least one seat-portion structure; and an understructure. The understructure includes at least one guide element comprising a guide groove. The guide groove includes a first portion and a second portion, called the inclined portion. The seat further includes at least one seatbelt attachment and at least one attachment support. The seatbelt attachment is mounted rotatably with respect to the attachment support via an attachment shaft. The attachment support is mounted rotatably with respect to the seat-portion structure via a support shaft. The head of the attachment shaft is arranged inside the inclined portion of the guide groove when the seat is in an upright position.

10 Claims, 5 Drawing Sheets

(56) References Cited

U.S. PATENT DOCUMENTS

| | | |
|---|---|---|
| 2012/0138745 A1 | 6/2012 | Marais et al. |
| 2016/0137302 A1* | 5/2016 | Valdes .................... B60R 22/26 297/468 |
| 2017/0021930 A1 | 1/2017 | Henshaw |
| 2019/0127070 A1* | 5/2019 | Oleson ............... B64D 11/0621 |

FOREIGN PATENT DOCUMENTS

| | | | |
|---|---|---|---|
| DE | 102010033752 B4 | 4/2020 | |
| EP | 3680173 B1 | 9/2021 | |
| FR | 2888549 A1 | 1/2007 | |
| WO | WO-2014093266 A1 * | 6/2014 | ............. B60N 2/688 |

\* cited by examiner

SEATBELT FASTENING SYSTEM FOR A MOVABLE SEAT

The present invention relates to a seat belt fastening system for a seat with a movable seat pan. The invention finds a particularly advantageous, but not exclusive, application with economy class aircraft seats.

In a manner known per se, an economy class seat generally includes several seating places each formed by a seat pan and a reclining seat back. Certain premium economy class seats are designed to allow forward translational movement of the seat relative to the seat structure. The kinematics can be motorized by means of a linear actuator provided with a motor body secured to the seat pan structure and a rod secured to the seat structure.

In order to preserve the passenger's comfort, the belt fastener is placed directly on the seat pan to prevent the passenger's pelvis from being compressed when the seat pan moves forward. According to such a configuration, the force path observable during a certification test passes directly into the seat pan and therefore through the motor body of the actuator. This is likely to lead to an uncontrolled movement of the motor body, posing safety problems.

The objective of the invention is in particular to effectively remedy this drawback by offering a seat, particularly for an aircraft, comprising:
 at least one seat pan structure, and
 a low structure,
characterized in that the low structure comprises at least one guide element extending in a general direction of longitudinal extension and comprising a guiding groove,
 said guiding groove comprising a first portion and a second portion, called inclined portion, forming a non-zero angle with respect to the general direction of longitudinal extension,
 said seat further comprising at least one belt fastener and at least one fastening support,
 said belt fastener being rotatably mounted relative to the fastening support via a fastening axis provided with a head cooperating with the guiding groove,
 said fastening support being rotatably mounted relative to the seat pan structure via a support axis provided with a head cooperating with the guiding groove,
 the head of the fastening axis being arranged inside the inclined portion of the guiding groove when the seat is in a raised position.

The invention thus allows the belt fastener to follow the kinematics of the moving seat pan so as to guarantee the comfort of the passenger. In addition, the axis of the belt fastener being in permanent contact with the low structure, the force passing through the belt fastener during a certification test is taken up mainly by the low structure of the seat. The invention thus avoids an uncontrolled movement of the motor body of a motorized actuator.

According to one embodiment of the invention, a distance measured between the fastening axis and the support axis is less than a length of the inclined portion of the guiding groove. A clearance is guaranteed between the fastening axis and the end of the guiding groove so that the raised and comfort positions of the kinematics are electrically controlled by the actuator without risk of mechanical interference. The clearance is obtained by adding, at the end of the guiding groove, an over-displacement of a few millimeters compared to the maximum variation in the position of the seat pan structure when the seat is in the raised position.

According to one embodiment of the invention, said seat comprises a motorized actuator so as to allow an automatic movement of said seat from the raised position to a rest position.

According to one embodiment of the invention, the motorized actuator comprises a motor body fixed to one of the elements among: the seat pan structure and the low structure as well as a guide rod having one end fixed to the other of the elements among: the seat pan structure and the low structure.

According to one embodiment of the invention, said seat comprises a slide capable of ensuring a guidance of a front part of the seat pan structure.

According to one embodiment of the invention, the slide comprises a rail fixed to the seat pan structure capable of sliding along a guide rotatably mounted relative to a front end of the guide element.

According to one embodiment of the invention, the slide is configured so that the seat pan structure forms a non-zero angle relative to a horizontal plane when the seat is in a comfort position.

According to one embodiment of the invention, the low structure comprises two spreaders on either side of the seat pan structure, the guide element being fixed to a corresponding spreader.

According to one embodiment of the invention, said seat further comprises a seat back structure rotatably mounted relative to the seat pan structure.

The invention also relates to an aircraft comprising at least one seat as previously defined.

The present invention will be better understood and other characteristics and advantages will become apparent on reading the following detailed description comprising embodiments given by way of illustration with reference to the appended figures, presented by way of non-limiting examples, which may be used to complete the understanding of the present invention and the presentation of its realization and, if necessary, contribute to its definition, wherein.

Identical, similar or analogous elements have the same reference from one figure to another. Furthermore, the orientation terms of the type "front", "rear", "horizontal", or "vertical" are understood by reference to the common sense given by a user seated on a seat according to the invention mounted inside an aircraft cabin.

Figure 1:
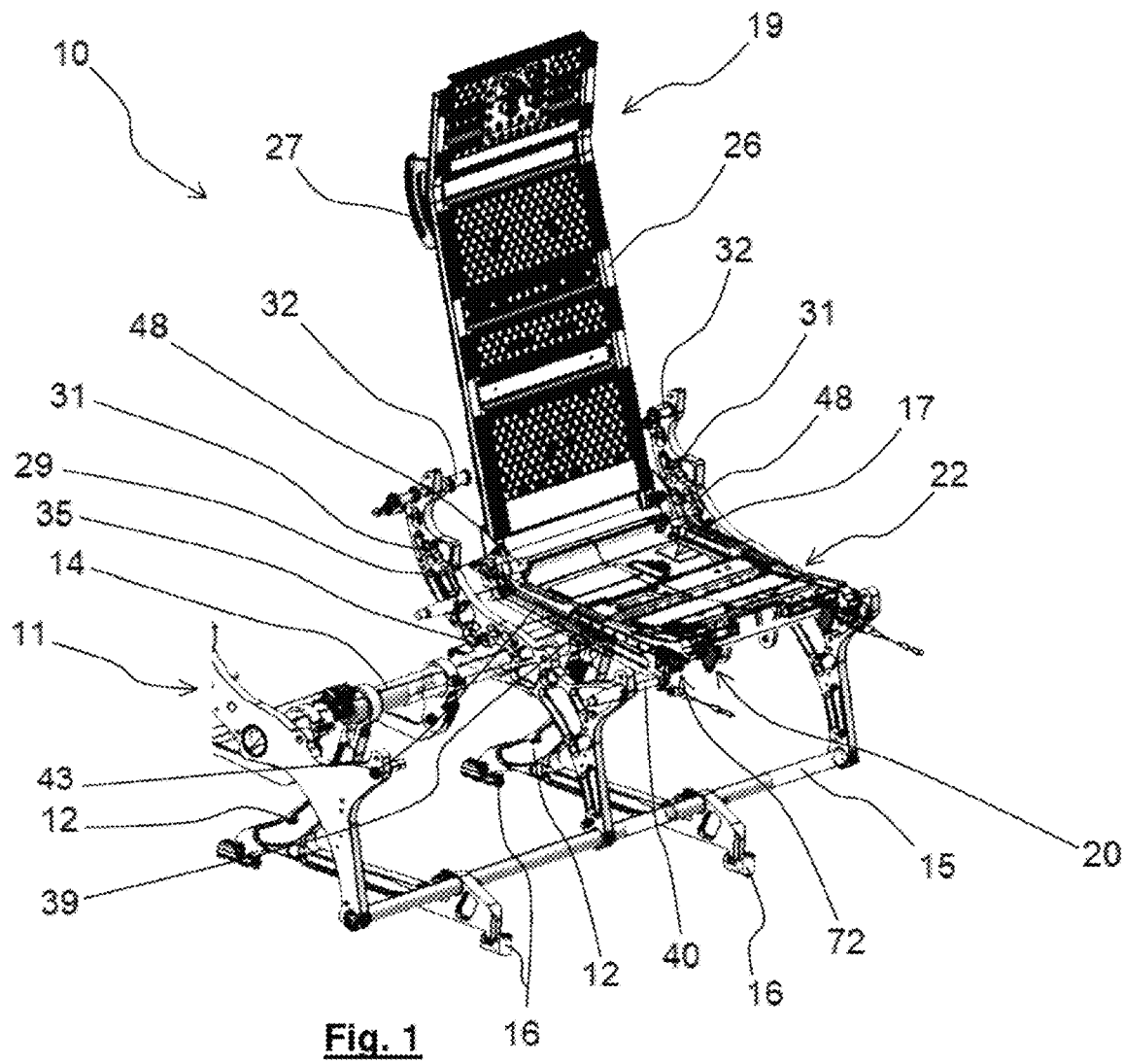
FIG. 1 is a perspective view of an aircraft seat according to the present invention.

FIG. 1 shows a premium economy class seat 10 comprising a low structure 11 to be fixed to the rails of an aircraft cabin. For this purpose, the low structure 11 comprises feet 12 fixed to an upper beam 14 and to a lower beam 15. The feet 12 are provided with fasteners 16 for cooperating with rails mounted on a floor of the aircraft cabin.

The seat 10 comprises at least one seat pan 17 and at least one seat back 19 rotatably mounted relative to the seat pan 17. The seat 10 may include several seat pans 17 and several seat backs 19 so as to define several places. The seat 10 is able to take in particular a raised position called TTL (Taxi-Take Off-Landing) which is used during the parking, take-off and landing phases of the aircraft. The seat 10 is also capable of taking a comfort position in which the seat pan 17 is advanced relative to the low structure 11 and inclined at an angle relative to a horizontal plane parallel to the floor of the aircraft, and the seat back is inclined at an angle relative to a vertical plane. In an exemplary embodiment, the angle of inclination of the seat pan 17 is between 10 and 20 degrees; while the angle of inclination of the seat back is between 30 and 60 degrees and is preferably around 45 degrees.

A motorized actuator 20 allows the seat 10 to pass automatically from one extreme position to another. The seat 10 may take intermediate positions between the raised position and the comfort position.

Figure 2A:
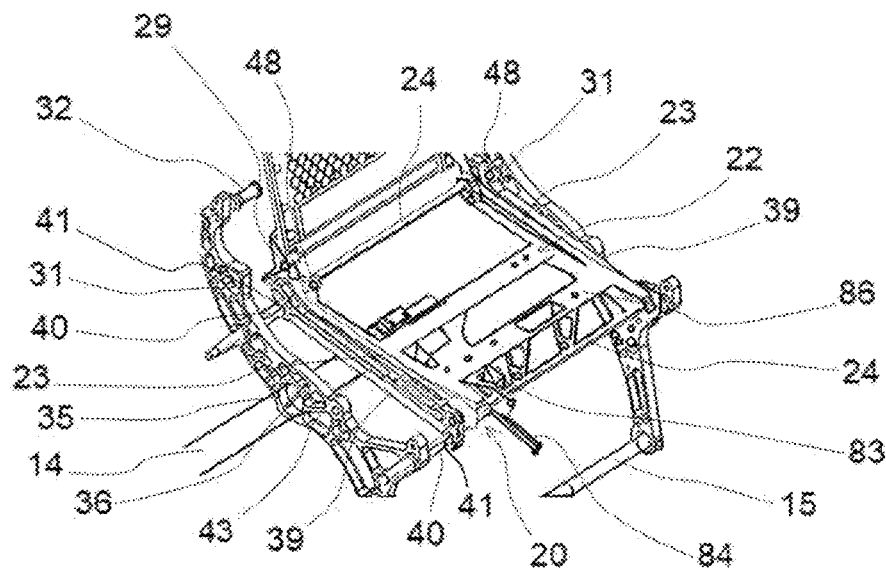
FIGS. 2a and 2b are perspective views illustrating the position of the seat pan structure of the aircraft seat according to the invention respectively when the seat is in a raised position and in a comfort position.

More precisely, the seat pan 17 comprises a seat pan structure 22 movably mounted relative to the low structure 11 along the guide element(s) 39 described in more detail below. The seat pan structure 22 comprises two bars 23 and two end crosspieces 24 ensuring a mechanical connection between the bars 23, as shown in FIG. 2a. The seat pan structure 22 may be covered with a sheet of metal on which a seat pan cushion is placed (not shown). The seat pan cushion is removably fixed to the seat pan structure 22 for example by means of a hook and loop device of Velcro type (registered trademark).

The seat back 19 comprises a seat back structure 26 covered with a sheet of metal 27 on which a seat back cushion is placed (not shown). The seat back structure 26 is articulated relative to the seat pan structure 22 via a pivot connection 29 with a horizontal axis.

Two spreaders 31 are arranged on either side of the seat pan structure 22. Each spreader 31 in the shape of an elongated S has a interface 32 for the fixation to an armrest (not shown). The armrest can be fixed or movable between a raised position and a lowered position.

Figure 2B:
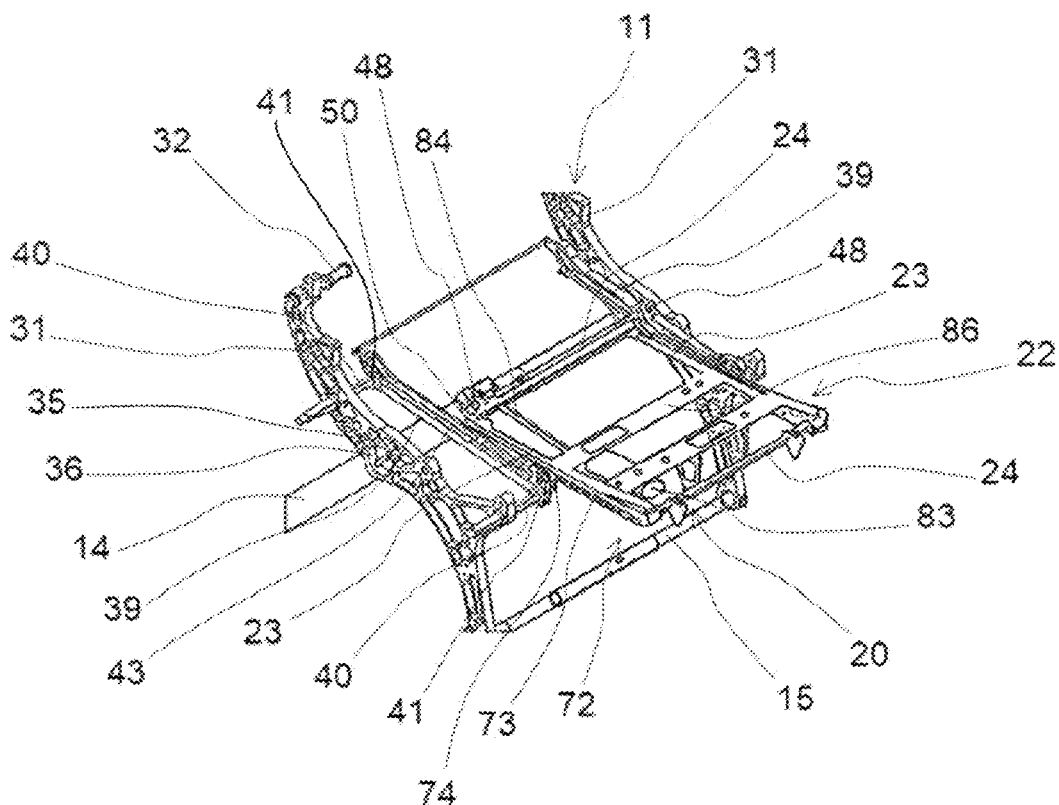

These spreaders 31 are mechanically linked to the upper beam 14. To this end, as can be seen in FIGS. 2a and 2b, each spreader 31 has an opening 35 for receiving the beam 14. A fixing member 36, such as a screw or a pin, extends radially along a diameter of the beam 14 to ensure the assembly is maintained. In addition, the spreaders 31 are mechanically connected to the lower beam 15.

Furthermore, two guide elements 39 of elongated shape are fixed each to a corresponding spreader 31. In this case, a guide element 39 is fixed to studs 40 secured to a spreader 31. To this end, each stud 40 has one end inserted into a housing 41 provided in the guide element 39. A pin 42 visible in FIG. 7 can be used to hold the assembly in position.

A guide element 39 extends in a general direction of longitudinal extension D1. The guide element 39 comprises a guiding groove 43 formed in an internal face facing the seat pan structure 22. As can be seen see in FIGS. 4a and 4b, the guiding groove 43 comprises a first portion 45 which is shown as being rectilinear in the figures and which extends in the general direction of longitudinal extension D1. However, for other models of seats, the first portion 45 could have a non-rectilinear shape, in particular a curved shape. The guiding groove 43 also includes a second portion, called inclined portion 46, shorter than the first portion 45. The inclined portion 46 forms an angle A1, shown in FIG. 4b, which is not zero, that is to say different from zero degree, relative to the general direction of longitudinal extension D1. The angle A1 is preferably between 40° and 90°. In other words, the guide element 39 comprises a first part which extends longitudinally in the direction of longitudinal extension D1 and which includes the first portion 45 of the groove which may be rectilinear or not according to the configuration of the seat and a second part which includes the inclined portion 46 of the groove forming a non-zero angle, that is to say different from zero degrees, between 40° and 90° relative to the direction of longitudinal extension D1.

Figure 3:
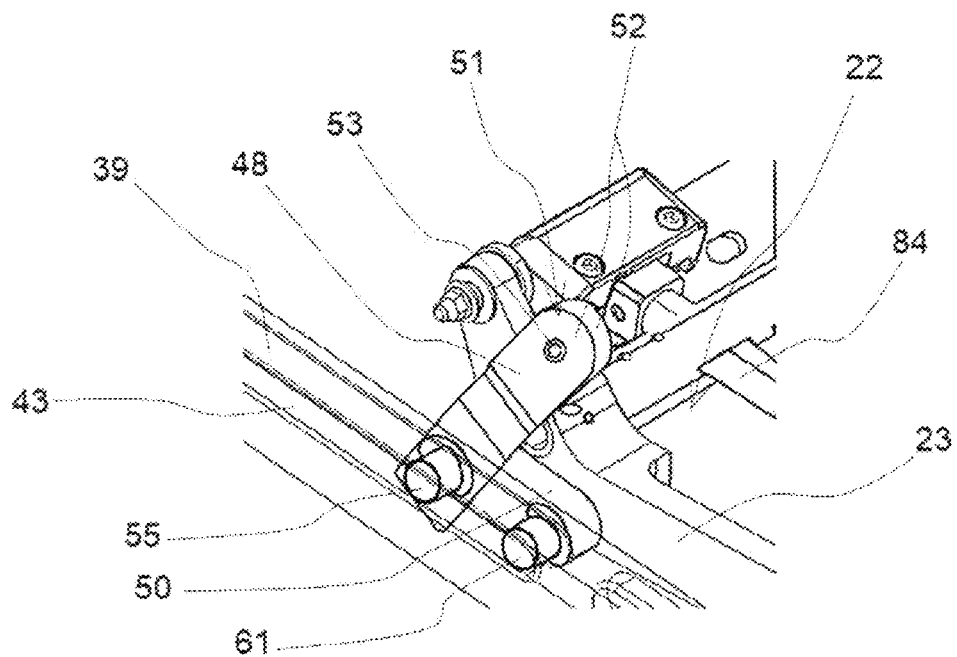
FIG. 3 is a detailed perspective view of a belt fastener and a fastening support for an aircraft seat according to the invention.
Figure 4A:
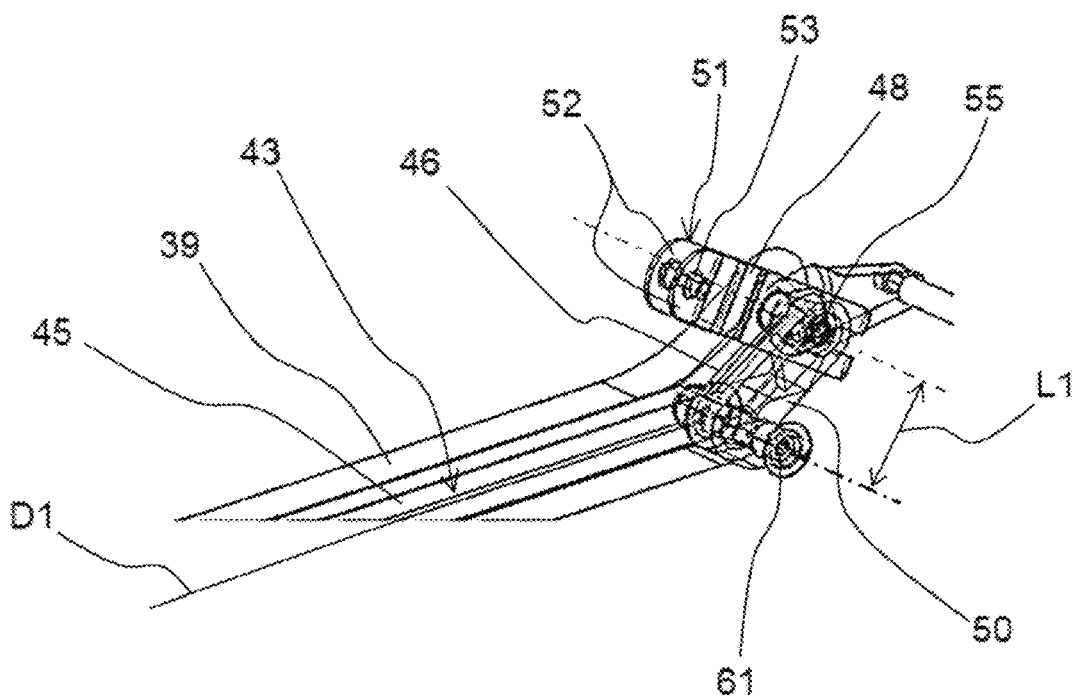
FIGS. 4a and 4b are views illustrating a positioning of the belt fastener and the fastening support respectively when the seat is in a raised position and in a comfort position.
Figure 4B:
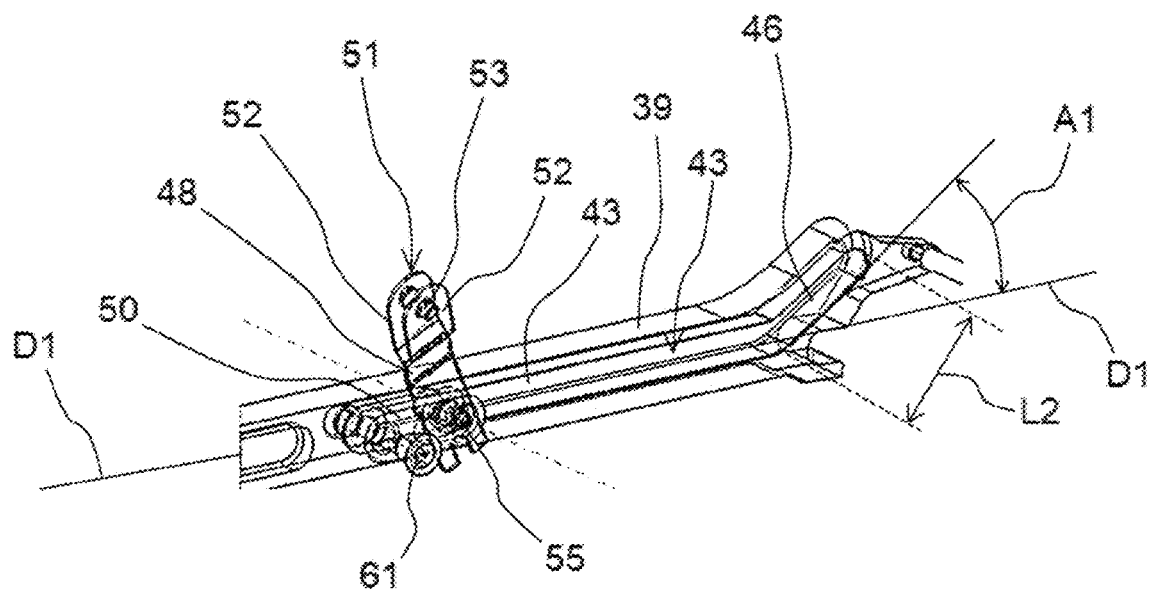

Furthermore, a belt fastener 48 and a fastening support 50 visible in FIGS. 3, 4a, and 4b are provided on each side of the seat 10. The belt fastener 48 comprises a device 51 for the fixation to a belt. This fixing device 51 comprises two wings 52 spaced from one another as well as a rod 53 to be inserted inside a belt buckle in order to maintain it on the fastener 48.

Figure 5:
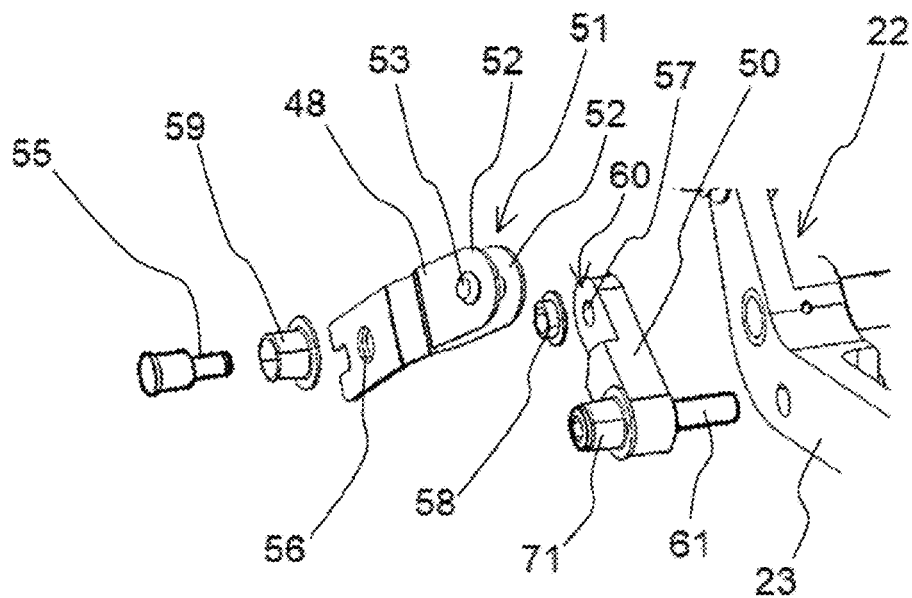
FIG. 5 is an exploded perspective view of the connection between the belt fastener and the fastening support of the aircraft seat according to the invention.

As shown in FIG. 5, the belt fastener 48 is rotatably mounted relative to the fastening support 50 via a fastener pin 55 provided with a head cooperating with the guiding groove 43. In other words, the head of the fastener pin 55 is inserted into the guiding groove 43. For this purpose, as it can be seen in FIG. 5, the fastening axis 55 of cylindrical shape passes through an opening 56 in the belt fastener 48 and an opening 57 in the fastening support 50. A bearing shell 58 may be inserted between the opening 56 of the fastener 48 and the fastening axis 55 in order to limit friction during rotation of the fastener 48 around the fastening axis 55. A bearing shell 59 may also cover the head of the fastening axis 55 in order to limit friction with the guiding groove 43.

A recess 60 could be provided at the portion of the fastening support 50 in which the opening 57 for the passage of the fastening axis 55 is made so as to limit the thickness of the mounted assembly "belt fastener 48—fastening support 50".

Figure 6:
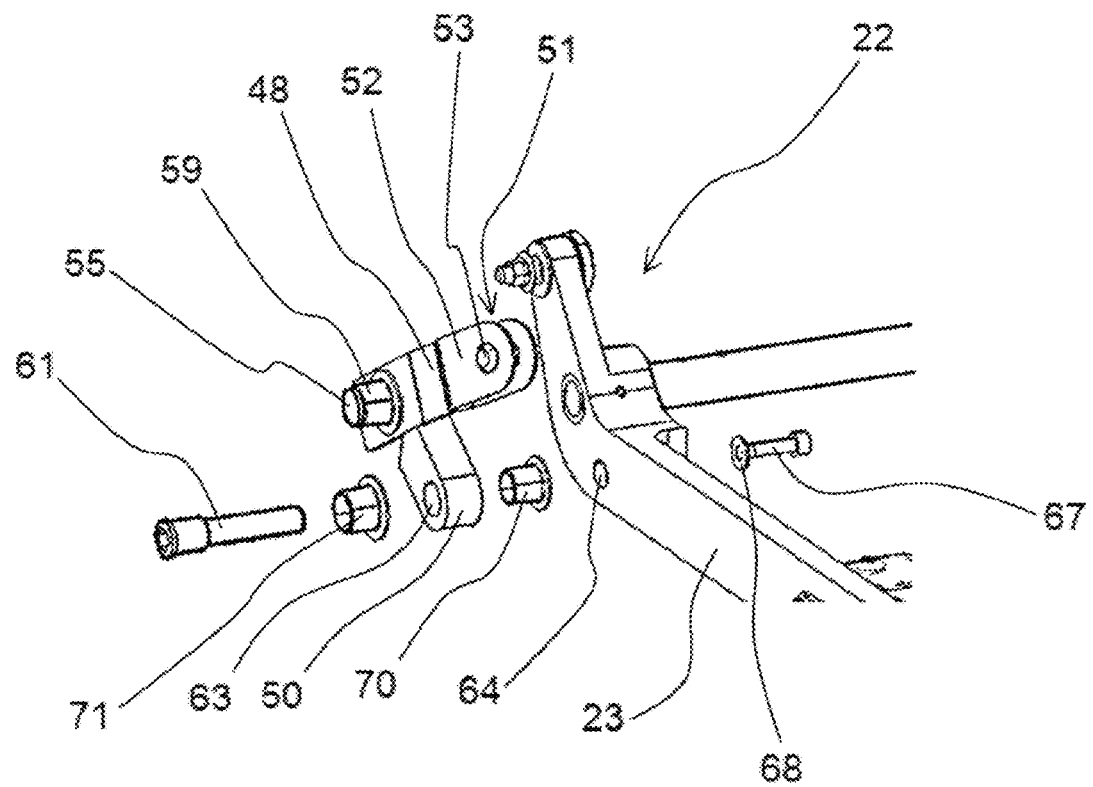
FIG. 6 is an exploded perspective view of the connection between the fastening support and the seat pan structure of the aircraft seat according to the invention.

As it can be seen in FIG. 6, the fastening support 50 is rotatably mounted relative to the seat pan structure 22 via a support axis 61 provided with a head cooperating with the guiding groove 43. In other words, the head of the support axis 61 is inserted into the guiding groove 43. The support axis 61 is linked in translation with the seat pan structure 22. For this purpose, the support axis 61 of cylindrical shape passes through an opening 63 in the support fastener 50 and an opening 64 in a bar 23 of the seat pan structure 22. A fixing screw 67 is inserted into a threaded opening in the support axis 61 in order to secure the axis of support 61 with the bar 23 and enable the fastening support 50 to rotate around the support axis 61. The fixing screw 67 can be associated with a washer 68.

A bearing shell 70 may be inserted between the opening 63 of the fastening support 50 and the support axis 61 in order to limit friction during rotation of the fastening support 50 around the support axis 61. A bearing shell 71 can also cover the head of the support axis 61 in order to limit friction with the guiding groove 43.

The head of the support axis 61 thus ensures guidance of the rear part of the seat pan structure 22 along the guiding groove 43 when the seat 10 passes from the raised position (or TTL position) to the comfort position, and vice versa.

Advantageously, as can be seen in FIG. 4a, when the seat 10 is in the raised position, the head of the fastening axis 55 cooperates with the inclined portion 46 of the guiding groove 43. During a certification test, the force applied by the mannequin on the belt fastener 48 has a direction forming an angle close to 90 degrees relative to the guiding groove 43. This force can be taken up mainly by the low structure 11.

Preferably, a distance L1 (see FIG. 4a) measured between the fastening axis 55 and the support axis 61 is less than a length L2 of the inclined portion 46 of the guiding groove 43 (see FIG. 4b). A clearance is thus guaranteed between the fastening axis 55 and the end of the guiding groove 43 so that the raised and comfort positions of the kinematics are electrically controlled by the actuator without risk of mechanical interference. The clearance is obtained by adding, at the end of the guiding groove 43, an over-displacement of a few millimeters compared to the maximum variation in the position of the seat pan structure when the seat 10 is in the raised position.

Figure 7:
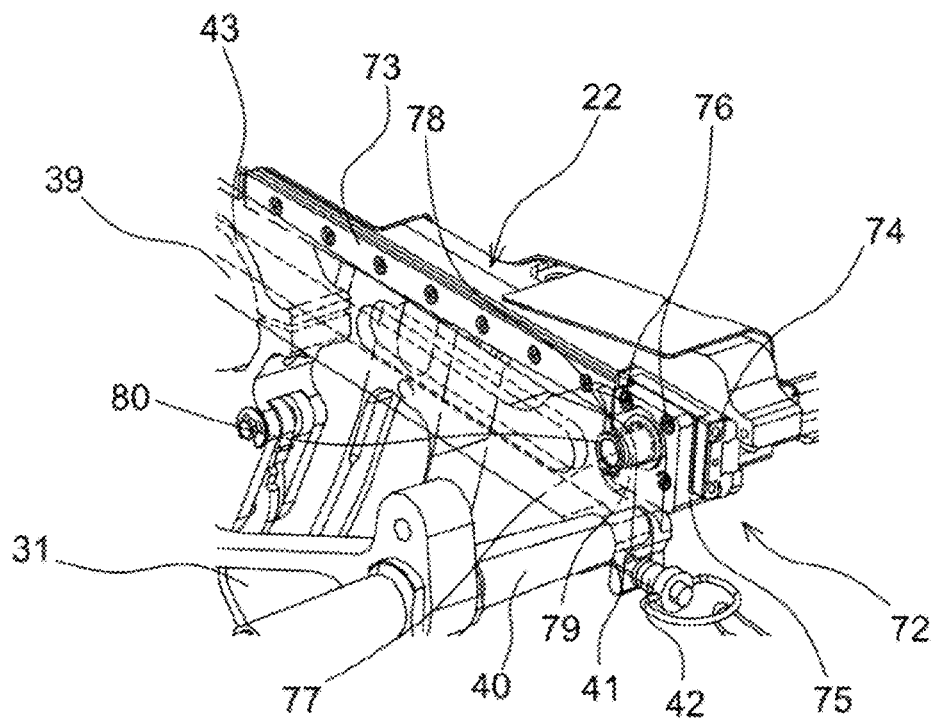
FIG. 7 is a detailed perspective view of a slide between a guide element and the seat pan structure of the aircraft seat according to the present invention.
Figure 8:
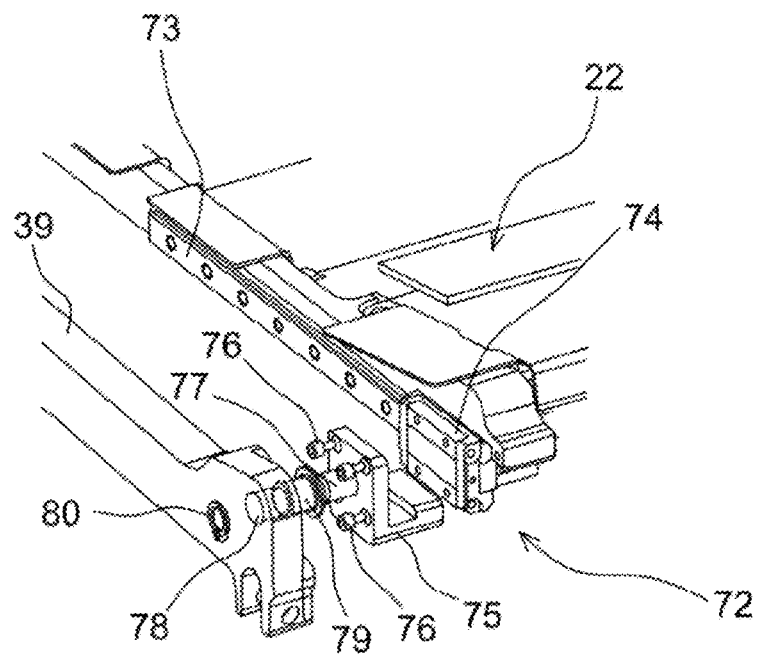
FIG. 8 is an exploded perspective view of the connection between a support and a guide of a slide of the seat according to the present invention.

Furthermore, as can be seen in FIGS. 7 and 8, a slide 72 is capable of ensuring guidance of a front part of the seat pan structure 22. For this purpose, the slide 72 comprises a rail 73 fixed to the seat pan structure 22 capable of sliding along a guide 74. The guide 74 is rotatably mounted relative to a front end of the guide element 39. For this purpose, the guide 74 is fixed to a guide support 75 by means of fixing members 76, such as screws. The guide support 75 is provided with a cylindrical axis 77 cooperating with an opening 78 in the guide element 39 via a bearing shell 79. In order to ensure axial maintenance of the cylindrical axis 77, a circlip 80 can cooperate with a circular groove in an external periphery of the axis 77.

As can be seen in FIGS. 2a and 2b, in order to ensure automatic movement of the seat 10 from one position to another, the motorized actuator 20 comprises a motor body 83 fixed to the seat pan structure 22 and a guide rod 84 having one end fixed to the low structure 11. In this case, the motor body 83 is fixed to an intermediate crosspiece 86 of the seat pan structure 22 while one end of the rod guide 84 is mounted on the support beam 14 for the spreaders 31. Alternatively, the configuration could be reversed, that is to say that the motor body 83 could be fixed to the low structure 11 while the end of the guide rod 84 could be fixed to the seat pan structure 22.

The operation of the seat 10 is described below when the passenger wishes to move it from a raised (or TTL) position to a comfort position. In the TTL position illustrated in FIG. 2a, the seat pan 17 extends in a substantially horizontal plane while the seat back 19 extends substantially in a vertical plane. In order to move the seat 10 to the comfort position, the passenger activates a control button which activates the motorized actuator 20 which moves the seat pan structure 22 forward as illustrated in FIG. 2b. The rear end of the seat pan structure 22 is guided along the guiding groove 43 via the head of the support axis 61 (see FIGS. 4a and 4b) while the front part of the seat pan structure 22 is guided along the slide 72 in such a way that the rail 73 fixed to a bar 23 of the seat pan structure 22 can slide along the guide 74. The slide 72 is configured in such a way that the seat pan structure 22 forms a non-zero angle, that is to say different from zero degree, relative to a horizontal plane when the seat 10 is in the comfort position.

A frontward movement of the seat pan structure 22 could result in a rearward movement of the seat back 19.

The invention also relates to an aircraft comprising at least one seat 10.

Of course, the different characteristics, variants and/or forms of embodiment of the present invention can be associated with each other in various combinations to the extent that they are not incompatible with one another or exclusive from one another.

Furthermore, the invention is not limited to the embodiments described above and provided solely by way of example. It encompasses various modifications, alternative forms and other variants that those skilled in the art may consider in the context of the present invention and in particular all combinations of the different modes of operation described above, which can be taken separately or in combination.

The invention claimed is:

1. A seat comprising:
   at least one seat pan comprising at least one seat pan structure, and
   a low structure,
   said seat pan structure being movable relative to the low structure, wherein the low structure comprises at least one guide element extending in a direction of longitudinal extension and comprising a guiding groove,
   said guiding groove comprising a first portion extending in the general direction of longitudinal extension and a second portion, called inclined portion, forming a non-zero angle relative to the direction of longitudinal extension,
   said seat further comprising at least one belt fastener and at least one fastening support,
   said belt fastener being rotatably mounted relative to the fastening support via a fastening axis provided with a head cooperating with the guiding groove,
   said fastening support being rotatably mounted relative to the seat pan structure via a support axis provided with a head cooperating with the guiding groove,
   the head of the fastening axis being disposed inside the inclined portion of the guiding groove when the seat is in a raised position.

2. The seat according to claim 1, wherein a distance measured between the fastening axis and the support axis is less than a length of the inclined portion of the guiding groove.

3. The seat according to claim 1, wherein it comprises a motorized actuator so as to allow automatic movement of said seat from the raised position to a rest position.

4. The seat according to claim 3, wherein the motorized actuator comprises a motor body fixed to one of the elements among: the seat pan structure and the low structure, as well as a guide rod having one end fixed to the other of the elements among: the seat pan structure and the low structure.

5. The seat according to claim 1, wherein it comprises a slide capable of ensuring guidance of a front part of the seat pan structure.

6. The seat according to claim 5, wherein the slide comprises a rail fixed to the seat pan structure capable of sliding along a guide rotatably mounted relative to a front end of the guide element.

7. The seat according to claim 5, wherein the slide is configured in such a way that the seat pan structure forms a non-zero angle relative to a horizontal plane when the seat is in a comfort position.

8. The seat according to claim 1, wherein the low structure comprises two spreaders arranged on either side of the seat pan structure, the guide element being fixed to a corresponding spreader.

9. The seat according to claim 1, wherein it further comprises a seat back structure rotatably mounted relative to the seat pan structure.

10. An aircraft comprising at least one seat as defined according to claim 1.

* * * * *